May 16, 1967   J. G. KNEILING   3,319,582
SIX-WHEEL TRUCK WITH BRAKE MEANS FOR RAILWAY CARS
Filed Feb. 18, 1965   2 Sheets-Sheet 2
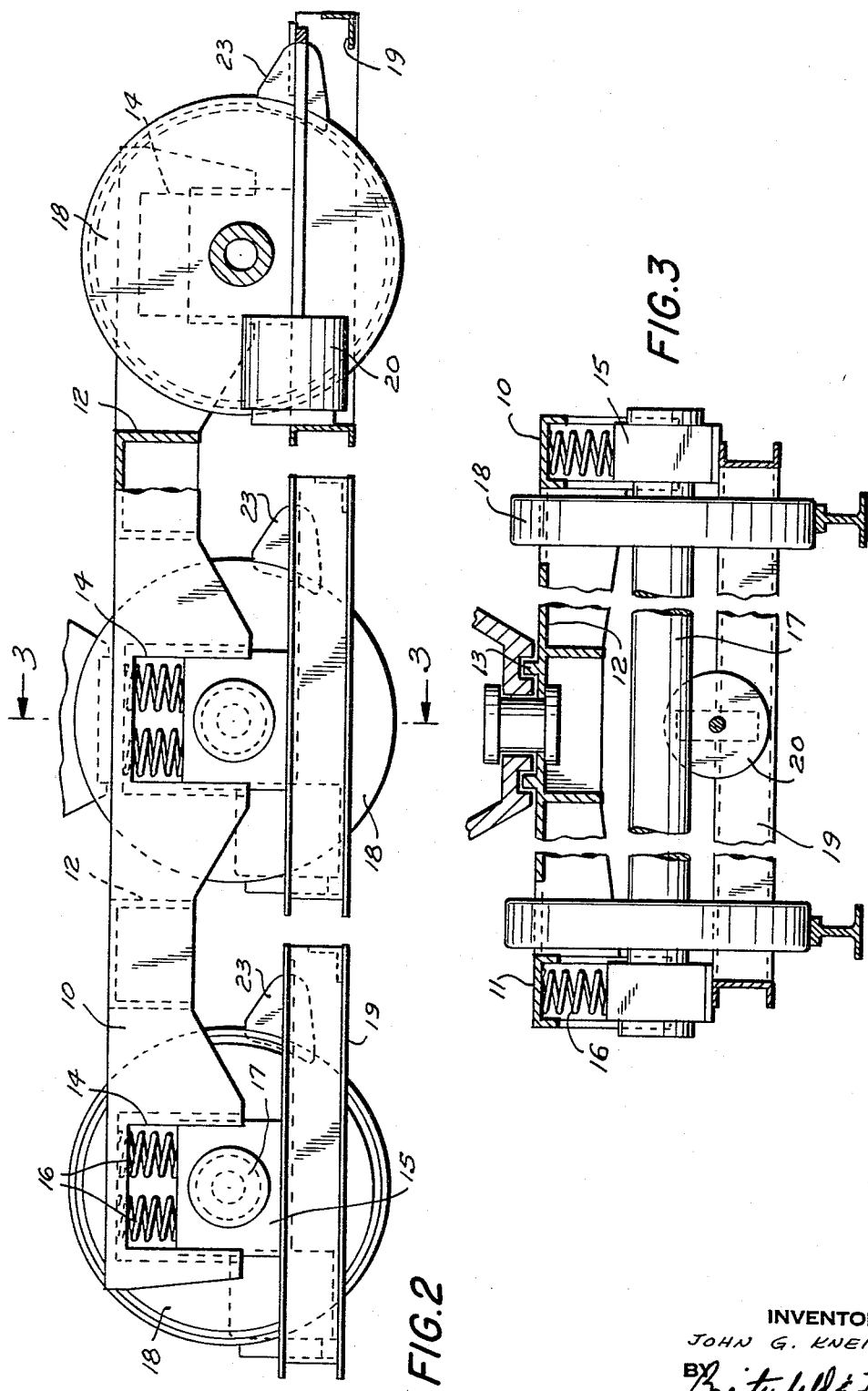
INVENTOR:
JOHN G. KNEILING
BY Breitenfeld & Levine
ATTORNEYS

United States Patent Office 3,319,582
Patented May 16, 1967

3,319,582
SIX-WHEEL TRUCK WITH BRAKE MEANS FOR RAILWAY CARS
John G. Kneiling, Staten Island, N.Y., assignor to Devenco Incorporated, New York, N.Y., a corporation of New York
Filed Feb. 18, 1965, Ser. No. 433,599
2 Claims. (Cl. 105—196)

This invention relates generally to railroad cars, and has particular reference to the trucks carrying the wheels and supporting the car body.

It is a general object of the invention to provide an improved six-wheel truck.

Conventionally, railroad cars are supported upon two 2-axle trucks, each truck thus carrying four wheels and the car being supported upon a total of eight wheels. Trucks having two axles each are relatively simple and inexpensive from a structural standpoint, and afford a highly practical means for supporting a car body. However, since the maximum allowable load per axle is approximately 65,000 pounds, the weight of the car as a whole, including whatever load it may be designed to carry, cannot exceed approximately 260,000 pounds. In a number of special situations, it may be desirable to employ a railroad car which imposes a greater weight than this upon the rails, and in such instances six-wheel trucks are desirable. For example, cars employed as locomotives, or as vehicles for supporting heavy motive-power machinery, large quantities of fuel, or heavy loads of freight, are often advantageously supported upon trucks provided with three axles each.

Trucks of this general type have heretofore been cumbersome and expensive, involving relatively complex articulated structures. It is an objective of the present invention to provide a six-wheel truck with is structurally relatively simple, low in cost from a manufacturing standpoint, and effective in affording a set of six individually sprung wheels without sacrificing the advantage of rigid wheel units, i.e., an axle with wheels rigidly secured to it at its opposite ends.

Among the features of the improved structure is the combination of a rigid chassis including lateral side frames, three wheel units each consisting of an axle with wheels rigidly secured to it, and a separate resilient cushion between each axle end and the side frame in which it is mounted. More particularly, each side frame is provided with three slots adapted respectively to receive the adjacent ends of the three axles, and each axle is provided at each end with a bearing mounted in guided slidable relation to its corresponding slot. Another important feature of the invention resides in providing an individual brake assembly in suspended relationship on each axle. Each brake assembly comprises, essentially, a pneumatic actuating cylinder, a transverse brake beam controlled by it, and brake shoes carried by the brake beam in operative relation to the wheels on the axle.

One way of attaining the foregoing objectives, and achieving the advantages of the invention, is illustrated in the accompanying drawings, in which—

FIG. 2 is in part an elevational view, and in part a cross-section, substantially along the line 2—2 of FIG. 1; and FIG. 3 is a cross-sectional view substantially along the line 3—3 of FIG. 2.

Figure 1:
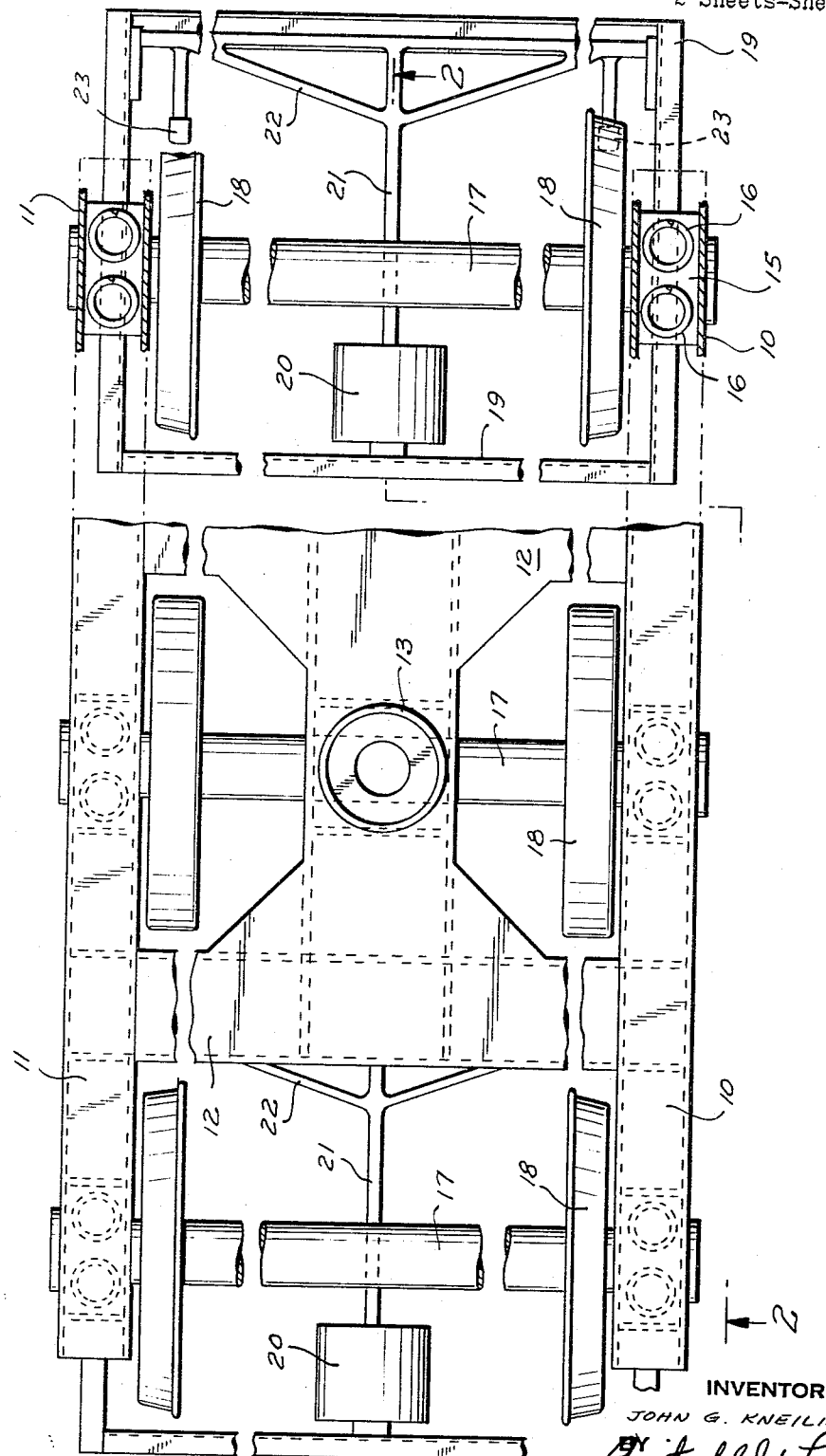
FIG. 1 is a plan view of a truck constructed in accordance with this invention, with the upper part broken away at the right to reveal the structure beneath.

For the sake of simplicity of illustration, the drawings depict the truck in somewhat simplified form, to reveal its essential aspects. Numerous structural details, well-known per se, have been omitted; but the basic nature of the invention, and its novel features, have been made clearly apparent.

It may also be noted that the drawings do not represent any particular dimensional scale, and the parts are not in true proportion.

The main frame of the truck is a rigid structure comprising a pair of parallel side frames 10 and 11 and transverse braces or bolsters such as those shown at 12. Mounted on the brace structure at the center of the frame is the usual pin or mounting 13 (sometimes known as a center casting) upon which the vehicle body rests in pivoted fashion. The side frames, bolsters and bracing are integrated into a single rigid chassis by casting, welding or other fastening means.

Each side frame is provided with three downwardly open slots or recesses 14, and each such recess has parallel sides serving as vertical guides for a rectangular bearing enclosure 15. Between the upper face of each bearing enclosure and the base of the slot in which it is mounted are compression springs 16. These springs have been shown in the form of coil springs, but it is to be understood that any appropriate cushioning means may be provided. So called Belleville springs have proven to be unusually satisfactory.

Each of the bearing enclosures 15 supports the chassis on one end of one of the three axles 17, and each axle is rigidly secured near its ends to a pair of wheels 18. The wheels on the outer axles are provided with the usual flanges, but the wheels on the central axle 17 are "bald" and do not have any flanges.

Rigidly secured to and supported on each pair of axle bearing enclosures 15 is a rigid rectangular frame 19. In the region between the wheels on each axle, this frame supports a brake mechanism as shown in FIG. 1. The brake mechanism comprises a pneumatic cylinder 20, a piston and piston rod assembly 21 actuated within it, a brake beam 22 connected to the piston and rod assembly 21 and slidably supported on the frame 19, and brake shoes 23 attached to the beam 22 in operative relationship to the corresponding wheels 18. The beam 22 is guided by elements 24 secured to the frame 19, and spring-pressed in wheel engaging direction.

It will be noted that each of the six wheels is individually spring-cushioned, while each wheel unit consists of a pair of wheels rigidly secured to an axle. Also, each of the six wheels is effectively provided with a braking instrumentality maintained in correct spatial relationship to it regardless of relative movement between the wheels and the rigid chassis or truck frame by the operation of the springs. Of primary importance is the circumstance that a single rigid frame or chassis effectively supports the car on all three wheel units, whereby structural simplicity and low cost manufacture are obtainable, and complexities and excess tare weight of articulation are avoided.

It will be understood that many of the details of the structure may be modified in accordance with conventional practice without necessarily departing from the spirit and scope of the invention as expressed in the appended claims.

What is claimed is:

1. In a railroad car, a six-wheel truck comprising a single rigid chassis including lateral side frames, bolsters, and bracing; three wheel units each consisting of an axle and wheels rigidly secured to it, each side frame being provided with three slots adapted respectively to receive the adjacent ends of said axles; a separate resilient cushion between each axle end and the base of the slot within which it is mounted, and an individual brake assembly suspended on each axle in a fixed spatial relationship thereto independent of the movement of said axle relative to the others and to the chassis, said brake assembly comprising a pneumatic actuating cylinder, a transverse brake beam controlled thereby, and brake shoes attached to said brake beam in operative relation to the wheels on said axle.

2. In a railroad car, a six-wheel truck comprising a single rigid chassis including lateral side frames, bolsters, and bracing; three wheel units each consisting of an axle and wheels rigidly secured to it, each side frame being provided with three slots adapted respectively to receive the adjacent ends of said axles; a bearing for each axle end, a bearing enclosure for mounting said bearing in guided slidable relation to its corresponding slot, a separate resilient cushion interposed between the base of each slot and its respective bearing enclosure, and an individual brake assembly suspended on each axle in a fixed spatial relationship thereto independent of the movement of said axle relative to the others and to the chassis, said brake assembly comprising a rigid rectangular frame secured to the bearing enclosures at the opposite ends of the axle, a pneumatic actuating cylinder carried by said frame, a transverse brake beam controlled by said cylinder and mounted for reciprocating movements on said frame, and brake shoes carried by said brake beam in operative relation to the wheels on said axle.

References Cited by the Examiner
UNITED STATES PATENTS

| | | | |
|---|---|---|---|
| 158,261 | 12/1874 | Eaton | 105—196 |
| 196,320 | 10/1877 | Anthony | 188—56 |
| 326,654 | 9/1885 | Hubbard | 105—196 |
| 408,993 | 8/1899 | Scott | 105—196 |
| 1,347,887 | 7/1920 | Barber | 105—196 |
| 1,358,320 | 11/1920 | Lockwood et al. | 105—196 |

ARTHUR L. LA POINT, *Primary Examiner.*

H. BELTRAN, *Assistant Examiner.*